No. 654,560. Patented July 24, 1900.
A. ANDZIEWICZ.
BICYCLE CRANK.
(Application filed Feb. 24, 1899.)

(No Model.)

WITNESSES:
B. Keir
L. A. Gardiner

INVENTOR
Antoni Andziewicz
BY
Charles S. Hill
ATTORNEY.

UNITED STATES PATENT OFFICE.

ANTONI ANDZIEWICZ, OF CHICAGO, ILLINOIS.

BICYCLE-CRANK.

SPECIFICATION forming part of Letters Patent No. 654,560, dated July 24, 1900.

Application filed February 24, 1899. Serial No. 706,706. (No model.)

*To all whom it may concern:*

Be it known that I, ANTONI ANDZIEWICZ, a citizen of the United States of America, residing at Chicago, in the county of Cook and State of Illinois, have invented certain new and useful Improvements in Bicycle-Cranks, of which the following is a specification.

Figure 1:
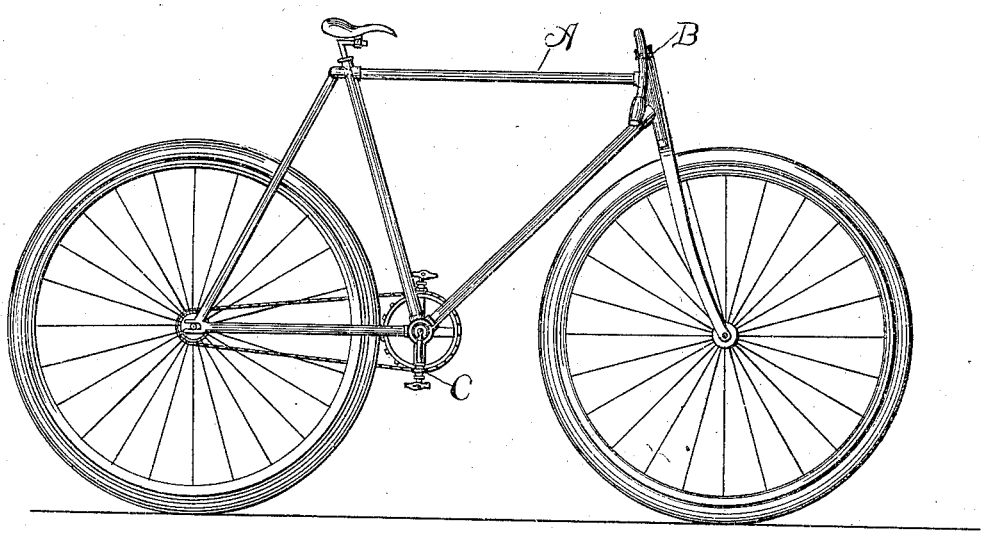
Figure 2:
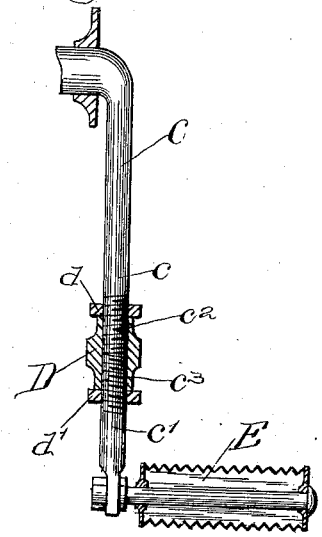

Referring to the accompanying drawings, wherein like reference-letters indicate the same or corresponding parts, Figure 1 is a side elevation of a bicycle equipped with my improved pedal-crank. Fig. 2 is a detail of my novel pedal-crank.

The object of my invention is to produce an improved adjustable bicycle pedal-crank; and to that end it consists in the features of construction and combinations hereinafter to be more particularly described, and set forth in the claims hereto annexed.

In the drawings, A is a bicycle equipped with my novel pedal-crank C.

Referring to Fig. 2, C is a pedal-crank formed of two parts $c$ $c'$, said parts having the ends $c^2$ $c^3$ threaded in opposite directions. D is a double-threaded nut or sleeve adapted when turned in one direction to engage the threaded ends $c^2$ $c^3$ and draw them together and when screwed in the opposite direction to cause said ends to separate the one from the other. $d$ $d'$ are clench-nuts respectively adapted to be upwardly or downwardly adjustable upon the threads $c^2$ $c^3$.

The operation of this form of my device is as follows: When it is desired to lengthen the pedal-crank C, the clench-nuts $d$ $d'$ are screwed away from the nut or sleeve D and the nut D is turned in the direction which causes the parts $c$ $c'$ to separate. When they are separated the distance desired, the clench-nuts may again be made to come in contact with the nut D, preventing the same from turning and the parts $c$ $c'$ from changing their position toward each other. When it is desired to shorten the length of the pedal-crank, if the parts $c$ $c'$ are not in contact with each other the operation described above may be reversed until such time as the parts meet.

It will be seen also that by loosening the clench-nuts $d$ $d'$ and by means of the nut D and by separating the parts $c$ $c'$ the pedal E may be turned to the right or left to such an extent, if desired, as to project inwardly and may be retained in that position by means of the nuts D $d$ $d'$ in the manner hereinbefore described.

The advantages of my novel pedal-crank are many, among which are, first, the pedals may be turned inwardly for purposes of shipment or they may be turned outwardly; secondly, it not infrequently happens that bicycle pedal-pins through accident become bent, so as to occasion great discomfort to the rider, to overcome which it is necessary to straighten the pedal-pin—which necessity may often be removed when the pedal-crank of my invention is employed, as the same result can be accomplished by turning the pedal in one or the other direction, and, again, it very frequently happens that bicycle-riders find upon trial that the pedal-cranks of their bicycles are not of the desired length, and to obtain the same they are obliged to procure other cranks, which is rendered entirely unnecessary by my invention, that permits the length of the pedal-crank to be varied.

It is obvious that the threads $c^2$ $c^3$ may be of any length and that instead of forming the pedal-crank C of two parts it may be formed of more than two parts, with a corresponding number of nuts D $d$ $d'$ and threads $c^2$ $c^3$ and in the equivalent form a corresponding number of nuts D and threads $c^2$ $c^3$.

Having thus described my invention, what I claim as new, and desire to secure by Letters Patent, is—

1. An improved longitudinally-adjustable pedal-crank consisting of two separate parts, the adjacent ends of each part provided with screw-threads, an internally-screw-threaded sleeve adapted to receive the screw-threaded ends of said separate parts, and independent locking members between said sleeve and said parts, whereby the two parts may be longitudinally adjusted and independently locked in respect to said sleeve, substantially as described.

2. An improved longitudinally-adjustable pedal-crank consisting of two separate and independent parts each having their adjacent ends screw-threaded, a screw-threaded sleeve adapted to receive the screw-threaded ends of said separate parts, and means for locking said separate parts against relative rotary movement in respect to said sleeve at any point throughout their range of travel in said sleeve, substantially as described.

ANTONI ANDZIEWICZ.

Witnesses:
L. A. GARDINER,
CHARLES S. HILL.